(12) United States Patent
Sakhnini et al.

(10) Patent No.: US 11,784,862 B1
(45) Date of Patent: Oct. 10, 2023

(54) MIXED GUARD INTERVAL CONFIGURATIONS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Junyi Li, Fairless Hills, PA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/580,976

(22) Filed: Jan. 21, 2022

(51) Int. Cl.
    *H04L 27/26* (2006.01)
(52) U.S. Cl.
    CPC ...... *H04L 27/2607* (2013.01); *H04L 27/2613* (2013.01)
(58) Field of Classification Search
    CPC ............. H04L 27/2607; H04L 27/2602; H04L 27/2613; H04L 27/2626
    USPC ......................................... 375/219, 220, 295
    See application file for complete search history.

(56) References Cited

U.S. PATENT DOCUMENTS

| | | | | |
|---|---|---|---|---|
| 2003/0031121 A1* | 2/2003 | Sudo | ....................... | H04L 5/006 370/203 |
| 2004/0066802 A1* | 4/2004 | Ro | ....................... | H04L 27/2607 370/208 |
| 2007/0274203 A1* | 11/2007 | Kimura | ............... | H04L 27/2647 370/208 |
| 2009/0141818 A1* | 6/2009 | Hiramatsu | ............ | H04L 5/0046 375/260 |
| 2019/0097859 A1* | 3/2019 | Bala | .................. | H04L 27/26132 |

FOREIGN PATENT DOCUMENTS

WO    WO-2018077395 A1 *  5/2018

* cited by examiner

*Primary Examiner* — Emmanuel Bayard
(74) *Attorney, Agent, or Firm* — Patterson + Sheridan, L.L.P.

(57) ABSTRACT

Certain aspects of the present disclosure provide techniques for wireless communications by a transmitter, comprising generating a waveform to be transmitted in one or more symbols, with a guard interval (GI) between adjacent symbols according to a GI configuration selected from a plurality of GI configurations, and transmitting the waveform with the GI between symbols.

28 Claims, 10 Drawing Sheets

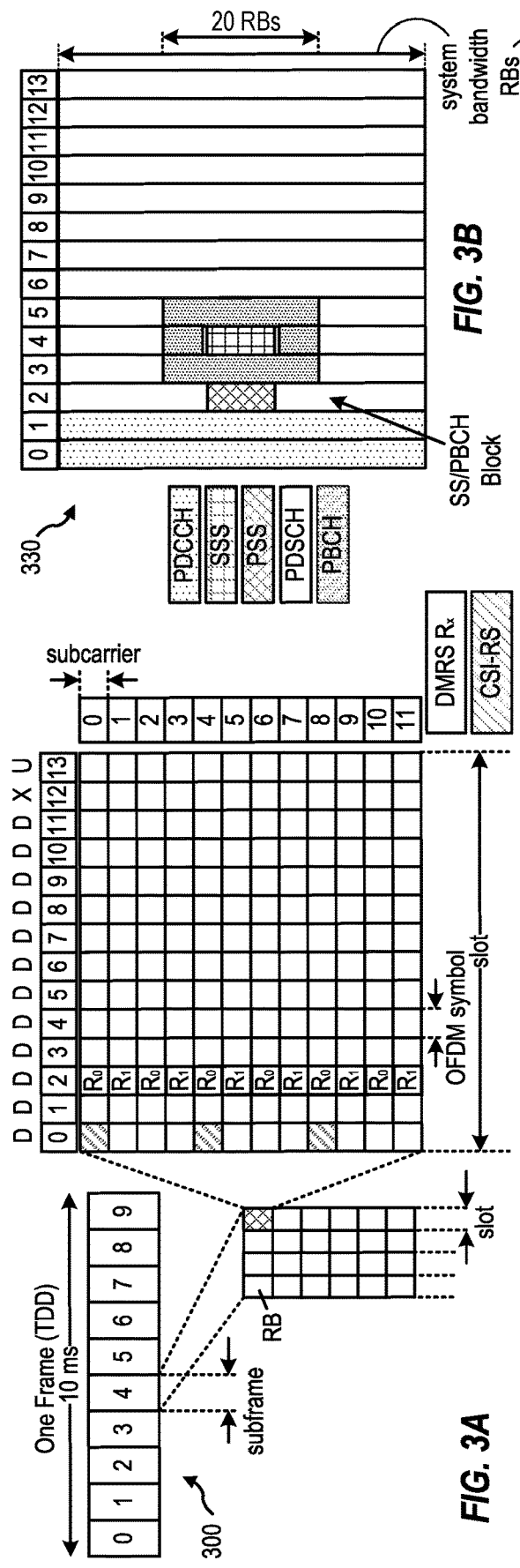
FIG. 3A
FIG. 3B
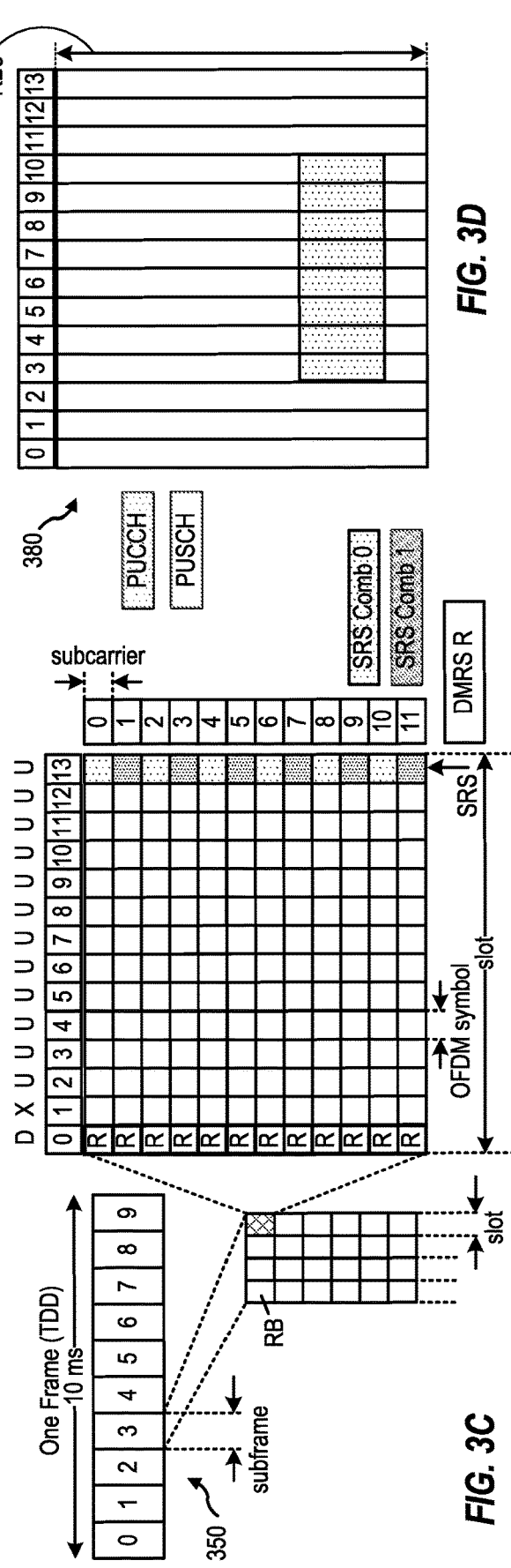
FIG. 3C
FIG. 3D

700

```
┌─────────────────────────────────────┐
│   A METHOD FOR WIRELESS COMMUNICATIONS BY A   │
│              TRANSMITTER            │
└─────────────────────────────────────┘
                    │
                    ▼                               ┌─ 710
┌──────────────────────────────────────────────────────────┐
│ GENERATE A WAVEFORM TO BE TRANSMITTED IN ONE OR MORE     │
│ SYMBOLS, WITH A GUARD INTERVAL (GI) BETWEEN ADJACENT     │
│ SYMBOLS ACCORDING TO A GI CONFIGURATION SELECTED FROM A  │
│ PLURALITY OF GI CONFIGURATIONS                           │
└──────────────────────────────────────────────────────────┘
                    │
                    ▼                               ┌─ 720
┌──────────────────────────────────────────────────────────┐
│   TRANSMIT THE WAVEFORM WITH THE GI BETWEEN SYMBOLS      │
└──────────────────────────────────────────────────────────┘
```

FIG. 7

800 

```
┌─────────────────────────────────────────┐
│  A METHOD FOR WIRELESS COMMUNICATIONS BY A │
│                 RECEIVER                │
└─────────────────────────────────────────┘
                    │
                    ▼                        ┌─ 810
┌─────────────────────────────────────────────┐
│ RECEIVE A WAVEFORM IN ONE OR MORE SYMBOLS; AND, WITH A │
│ GUARD INTERVAL (GI) BETWEEN ADJACENT SYMBOLS ACCORDING TO │
│ A GI CONFIGURATION SELECTED FROM A PLURALITY OF GI │
│               CONFIGURATIONS                │
└─────────────────────────────────────────────┘
                    │
                    ▼                        ┌─ 820
┌─────────────────────────────────────────────┐
│  PROCESS THE WAVEFORM BASED ON THE GI BETWEEN SYMBOLS │
└─────────────────────────────────────────────┘
```

*FIG. 8*

MIXED GUARD INTERVAL CONFIGURATIONS

INTRODUCTION

Aspects of the present disclosure relate to wireless communications, and more particularly, to techniques for supporting multiple guard interval (GI) configurations for various waveforms.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a transmitter. The method generally includes generating a waveform to be transmitted in one or more symbols, with a guard interval (GI) between adjacent symbols according to a GI configuration selected from a plurality of GI configurations. The method generally includes transmitting the waveform with the GI between symbols One aspect provides a method for wireless communications by a receiver. The method generally includes receiving a waveform in one or more symbols with a GI between adjacent symbols according to a GI configuration selected from a plurality of GI configurations. The method generally includes processing the waveform based on the GI between symbols.

One aspect provides an apparatus for wireless communications by a transmitter. The apparatus may include means for generating a waveform to be transmitted in one or more symbols, with a GI between adjacent symbols according to a GI configuration selected from a plurality of GI configurations. The apparatus may include means for transmitting the waveform with the GI between symbols.

One aspect provides an apparatus for wireless communications by a receiver. The apparatus may include means for receiving a waveform in one or more symbols with a GI between adjacent symbols according to a GI configuration selected from a plurality of GI configurations. The apparatus may include means for processing the waveform based on the GI between symbols.

One aspect provides a method for wireless communications by a receiver. The method generally includes receiving a waveform in one or more symbols and, with a guard interval (GI) between adjacent symbols according to a GI configuration selected from a plurality of GI configurations and processing the waveform based on the GI between symbols.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 7 is a flow diagram illustrating example operations for wireless communication by a transmitter, in accordance with certain aspects of the present disclosure.

FIG. 8 is a flow diagram illustrating example operations for wireless communication by a receiver, in accordance with certain aspects of the present disclosure.

DETAILED DESCRIPTION

Aspects of the present disclosure provide apparatuses, methods, processing systems, and computer-readable mediums for supporting multiple guard interval (GI) configurations.

5G wireless technology may utilize a variety of waveforms and, in some cases, may dynamically switch between waveforms. An issue may arise from implementing from dynamic waveform switching is symbol overlap and interference. To address this issue, a wireless device may insert a guard interval between transmitted symbols so that if there is any potential symbol overlap or delay spread, the symbols will not overlap to create inter-symbol interference. Additionally, it is beneficial to utilize a simple equalizer (e.g., frequency domain equalization or FDE) at a wireless receiver.

To implement FDE, the transmitter may perform a linear convolution of transmitted symbols with the channel converted to a circular convolution. The linear to circular convolution conversion is only possible where the last portion of a symbol is equal to a first portion of a symbol. Typically, a wireless device may utilize a cyclic prefix (CP) to avoid symbol interference and enable linear to circular convolution conversion. However, it is difficult to change the length of a CP (making it difficult to adapt to delay spreads), and, a CP typically comprises random data, which itself has minimal function.

According to certain aspects of the present disclosure, a transmitter may support multiple configurations for generating and transmitting a GI between symbols. Like a CP, a GI may minimize symbol overlap and enable linear to circular convolution conversion. Unlike a CP, a GI can either be a series of zeros (e.g., a Zero Tail (ZT) configuration) or a known sequence (e.g., a Unique Word (UW) configuration), meaning that the GI data may be utilized for a specific purpose. Additionally, by supporting multiple a transmitter may change the GI length adaptively (e.g., to adapt to delay spreads without changing symbol durations).

A transmitter may generate a GI based on a certain parameters or use purposes (e.g., an intended use of the GI, a type of channel transmitted on a waveform, or a type of reference signal transmitted on a waveform). This allows a transmitter to optimize GI usage based on the needs of a network.

Introduction to Wireless Communication Networks

Figure 1:
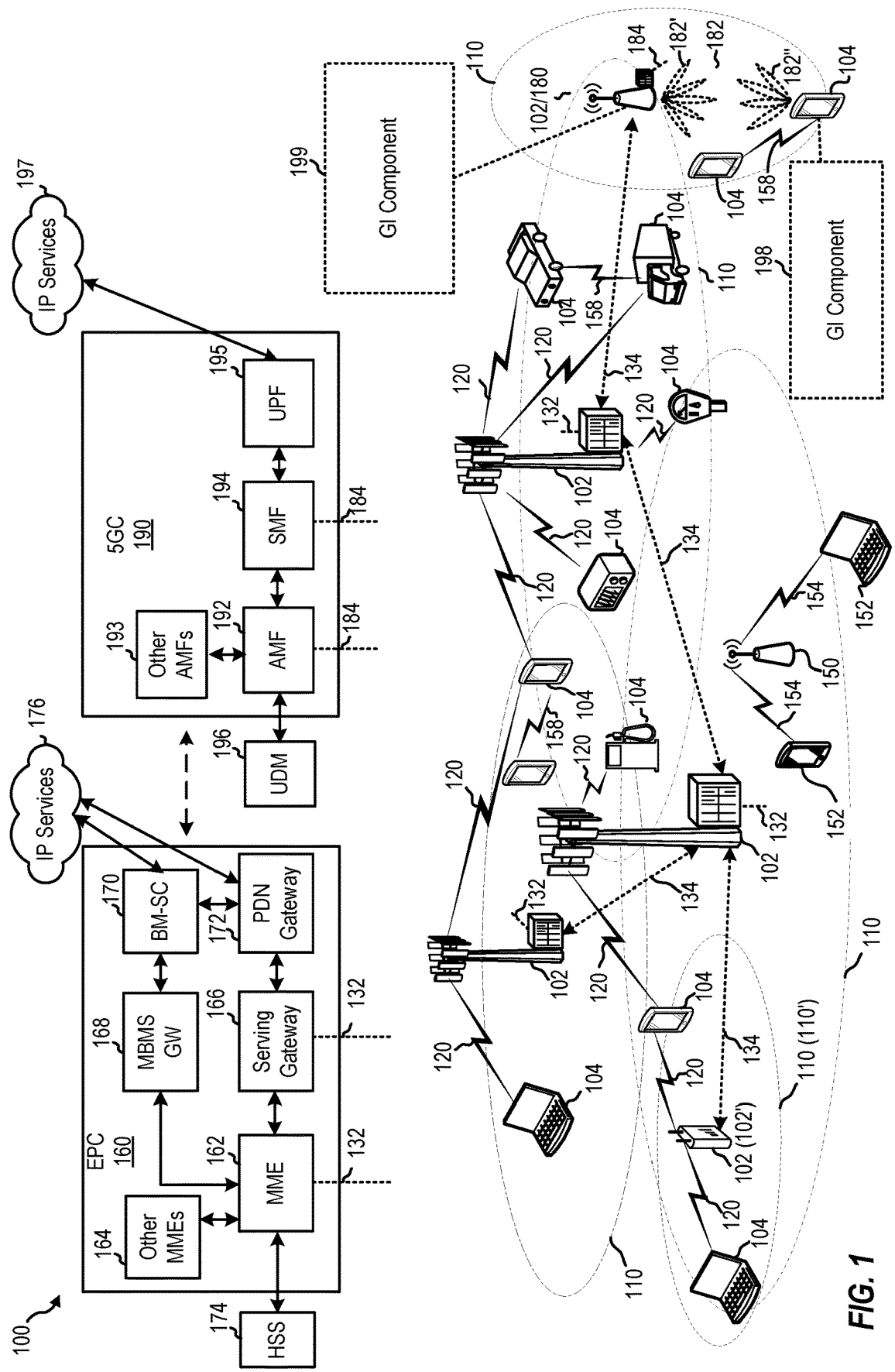
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes GI component 199, which may be configured to transmitting or receiving a waveform with a guard interval between symbols. Wireless network 100 further includes GI component 198, which may be used configured to transmitting or receiving a waveform with a guard interval between symbols.

Figure 2:
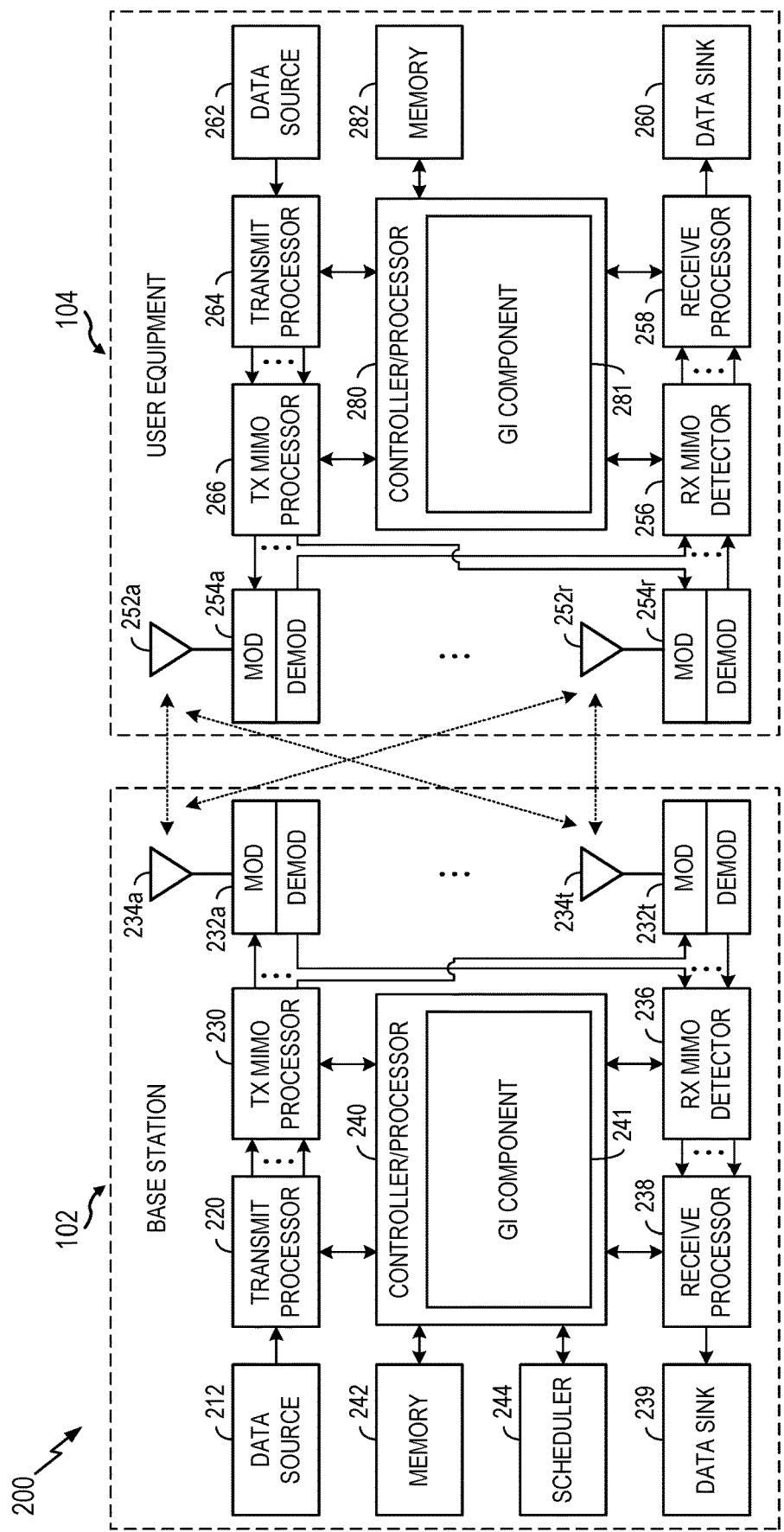
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes GI component 241, which may be representative of GI component 199 of FIG. 1. Notably, while depicted as an aspect of controller/processor 240, GI component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes GI component 281, which may be representative of GI component 198 of FIG. 1. Notably, while depicted as an aspect of controller/processor 280, GI component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Supporting Multiple Guard Interval Configurations

In 5G new radio (NR), with have higher operating bands, larger bandwidths are often used. Operating in these higher bands may present various challenges, such as higher phase noise (PN), the need to lower peak to average power ratio (PAPR), and increased complexity (which may be a factor, particularly for UEs). Various waveforms may be considered, in order to address such challenges.

One example waveform is a cyclic prefix orthogonal frequency division multiplexing (CP-OFDM) waveform. CP-OFDM processing may have relatively higher complexity than other waveforms. It may allow for single tap frequency division equalization (FDE) and efficient bandwidth (BW) utilization. It allows for easier frequency domain multiplexing (FDM). It has increased sub-carrier spacing (SCS) and may be suitable for higher-order multiple input multiple output (MIMO).

Another example waveform is a single carrier (SC) frequency division (FD) implementation, for example, of a direct Fourier transform spread OFDM (DFT-s-OFDM) waveform. A CP or guard interval (GI) may be used. Either implementation may utilize a single tap FDE and may result in relatively efficient bandwidth (BW) utilization. Either implementation has increased sub-carrier spacing (SCS). The frequency division multiplexing (FDM) Of Spread OFDM may have some impact on peak-to-average power ratio (PAPR). For example, DFT-s-OFDM typically has reduced PAPR when compared to CP-OFDM.

Another example waveform is a single carrier time division (TD) implementation, such as SC-QAM. SC-QAM based transmissions may use a CP or GI. Either implementation has lower complexity than other waveforms. Either implementation utilizes single tap FDE or time domain equalization (TDE). SC-QAM may be implemented using FDM with guard bands. SC-QAM may be considered optimal, in some cases, for lower signal-to-noise ratio (SNR). In some cases, TD filtering may help lower PAPR.

5G wireless technology may utilize any of the above waveforms, and may dynamically switch between the example waveforms and additional waveforms. An issue that may arise from implementing from this dynamic waveform switching is symbol overlap and interference. To address this issue, a wireless device may insert a guard between transmitted symbols so that if there is any potential symbol overlap or delay spread, the symbols will not overlap to create inter-symbol interference.

Additionally, it is beneficial to utilize a simple equalizer (e.g., FDE) at a wireless receiver. To implement FDE, the transmitter may perform a linear convolution of transmitted symbols with the channel converted to a circular convolution. The linear to circular convolution conversion is possible where the last portion of a symbol is equal to a first portion of a symbol.

Figure 4:
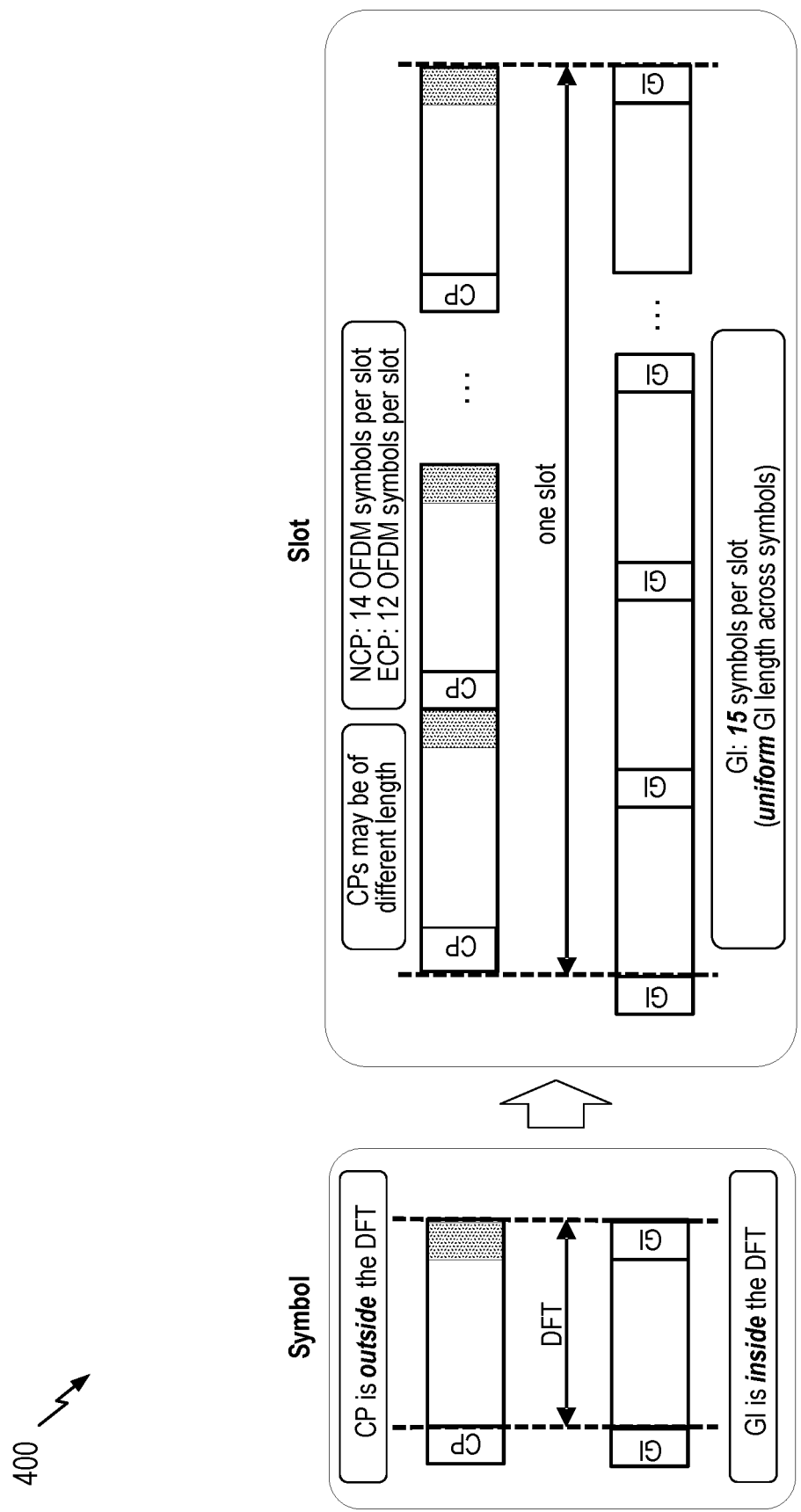
FIG. 4 depicts an example slot having cyclic prefix (CPs) or guard intervals (GIs) between symbols.

A cyclic prefix (CP) may be used to avoid symbol interference and enable linear to circular convolution conversion. As illustrated in FIG. 4, a CP may be slot-contained, and CPs may have different lengths. For example, a "normal" CP (NCP) length may be used for slots that have 14 OFDM symbols, while an extended CP (ECP) length may be used for slots that have 12 OFDM symbols.

Figure 6A:
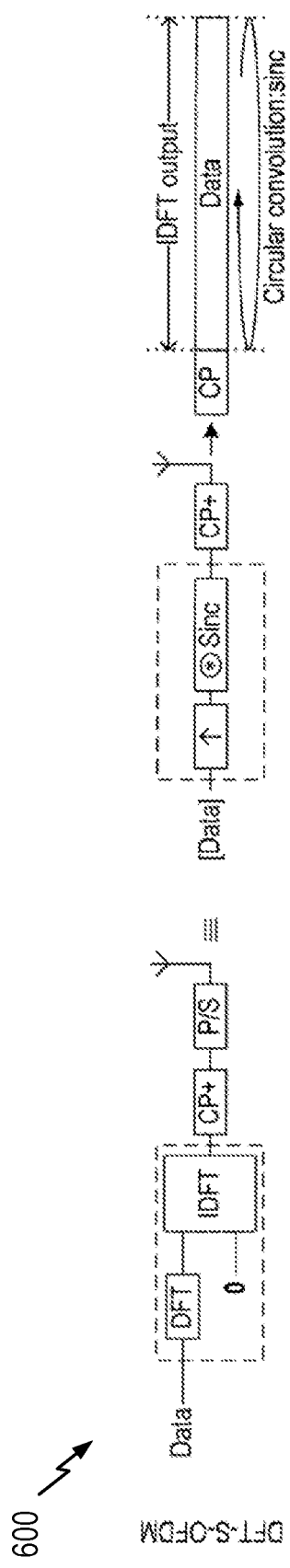
FIG. 6A, FIG. 6B, and FIG. 6C depict example output for various waveforms utilizing various CP and GI configurations, in accordance with certain aspects of the present disclosure.

As illustrated, a CP typically falls outside of a discrete Fourier transform (DFT). This is further illustrated in FIG. 6A, where a CP is implemented only after the inverse DFT (IDFT). In FIG. 6A, only data undergoes a DFT, and subsequent IDFT. CP is added after the IDFT and the combination of data and CP is transmitted. As a result, it is difficult to change the length of a CP. Additionally, a CP comprises random data, the random data itself having minimal function.

As illustrated in FIG. 4, a GI falls within the DFT. This allows a transmitter to change the GI length adaptively for any DFT length. However, GI length within a slot may be uniform across symbols.

According to certain aspects of the present disclosure, a transmitter may generate and transmit a GI in place of a CP. Like a CP, a GI may minimize symbol overlap and enable linear to circular convolution conversion. Unlike a CP, a GI can either be a series of zeros (e.g., a Zero Tail (ZT) configuration) or a known sequence (e.g., a Unique Word (UW) configuration). Because a GI may be a known sequence, it can be utilized for a specific purpose (e.g., synchronization, transporting information, phase tracking, and other suitable purposes).

Figure 5:
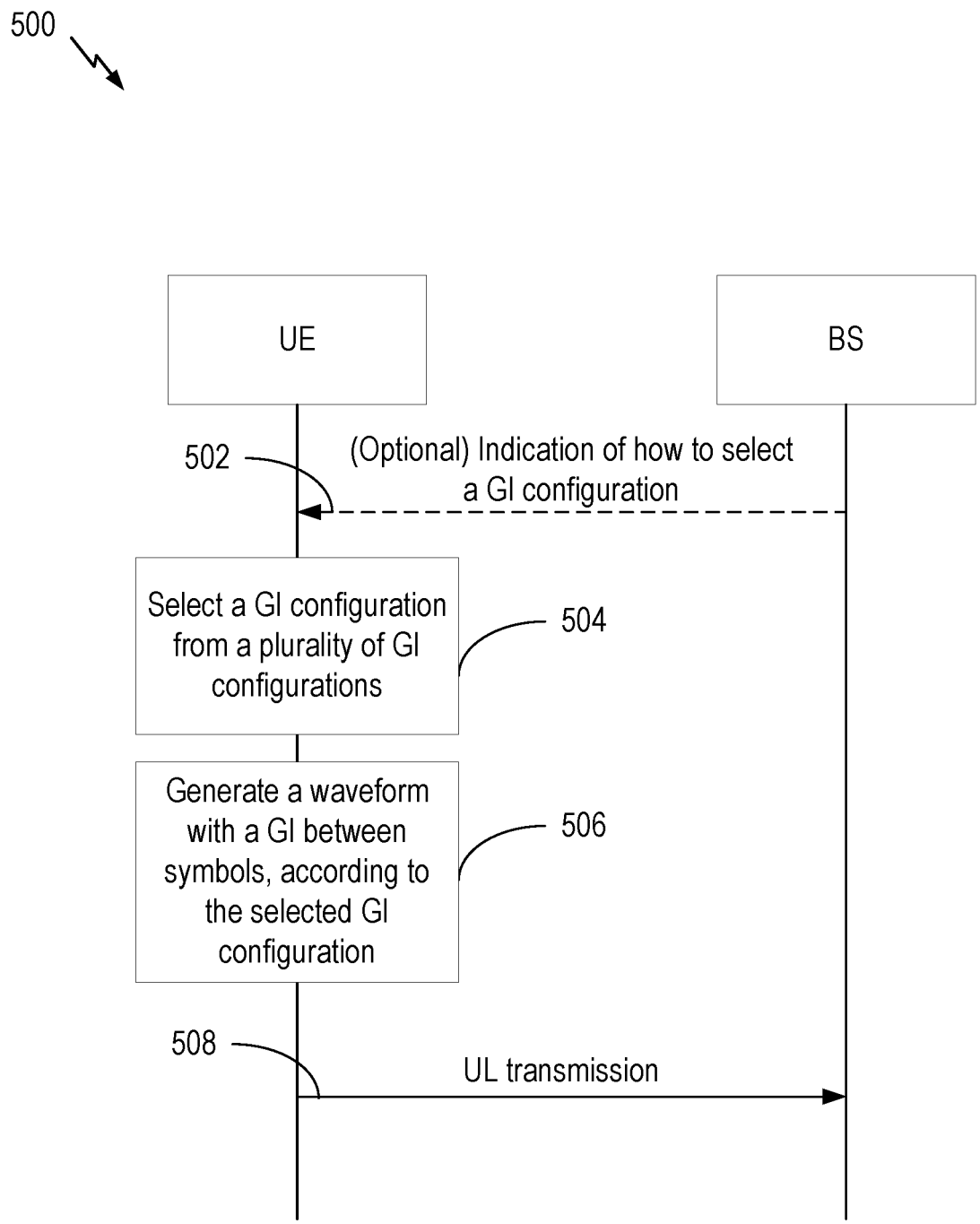
FIG. 5 is a call flow diagram illustrating an example of communications that support multiple GI configurations, in accordance with certain aspects of the present disclosure.

FIG. 5 illustrates example communications between a user equipment (UE) and a base station (BS) for the purpose of selecting and implementing a GI configuration for an uplink (UL) transmission.

At 502, the BS (acting as a receiver here) sends an optional indication of how to select a GI configuration. At 504, a UE (acting as a transmitter here) selects a GI configuration from a plurality of GI configurations. The selection at 504 may be based on the indication at 502, for example, or it may be based on other information or considerations.

At 506, the UE generates a waveform with a GI between symbols, according to the selected GI configuration. At 508, a UE transmits an UL transmission with the GI configuration.

Figure 6B:
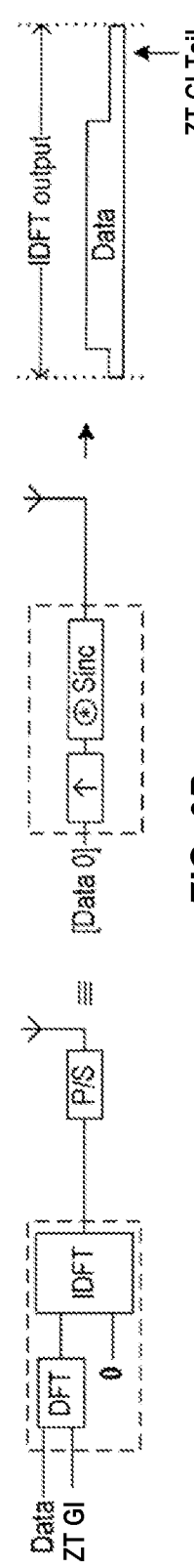
Figure 6C:
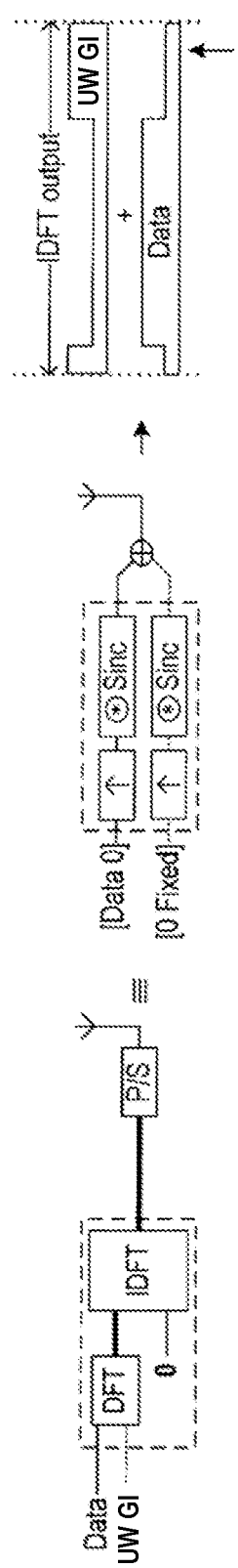

FIGS. 6A-6C illustrate the difference between CP-based transmissions and GI-based transmission.

As illustrated in FIG. 6A, a CP may implemented after the inverse DFT (IDFT). In FIG. 6A, only data undergoes a DFT, and subsequent IDFT. The CP is added after the IDFT and the combination of data. As a result, it is typically difficult to (dynamically) change the length of a CP. Additionally, a CP comprises random data, the random data itself having minimal purposes.

As discussed above, a GI may be a series of zeros or a known sequence. FIG. 6B illustrates a ZT GI implementation FIG. 6B illustrates a ZT GI implementation, and FIG. 6C illustrates a UW GI implementation. Both FIGS. 6B & 6C depict a GI implemented for DFT-s-OFDM waveform As discussed above, a GI may be a series of zeros or a known sequence. FIG. 6B illustrates a ZT GI implementation, and FIG. 6C illustrates a UW GI implementation. Both FIGS. 6B & 6C depict a GI implemented for DFT-s-OFDM waveform.

For ZT, zeros are appended at the end (and in some instances, the beginning) of the modulation symbols. As illustrated in FIG. 6B, a ZT GI configuration may place a GI containing a series of zeroes within a DFT. After the IDFT, the transmitted output, Data 0, contains Data and a Tail. The Tail corresponds to the ZT GI.

As illustrated in FIG. 6C, a UW GI configuration typically places a GI containing a known sequence (i.e., Fixed) within a DFT. After the IDFT, the transmitted output comprises Data 0 and 0 Fixed. Data 0 contains Data and a Tail. 0 Fixed comprises the known sequence. Both the Tail and 0 Fixed correspond to the UW GI.

According to certain aspects of the present disclosure, a transmitter may be configured with multiple GI configurations. The transmitter (e.g., a UE) may determine which GI configuration to use based on various factors.

There are various ways to generate the GI, for example, based on certain parameters or use purposes (e.g., an intended use of the GI, a type of channel transmitted on a waveform, or a type of reference signal transmitted on a waveform). Multiple GI configurations may depend on the use case (e.g., channel estimation vs switching gap), and/or Channel (e.g., PDCCH vs PDSCH), and/or Signal type (e.g., demodulation reference signal (DRMS), phase tracking reference signal (PTRS)).

In one example, both ZT and UW GI configurations may address a shared oversampling problem. Where the DFT is smaller than the IDFT, the output may be an oversampled version of the input. This may cause data leakage into the GI, which may make the circular convolution property imperfect. To solve this, a ZT GI adds gaps (e.g., for transmission, reception, or beam switching), which may be utilized for better multiplexing.

In one example, where a receiver (e.g., the BS of FIG. 5) is more complex, a UW GI configuration may be adapted to meet the requirements of the receiver, for example, where a ZT GI configuration may not be useful for, e.g., tracking and channel estimation. A known sequence in a UW GI configuration may allow a receiver to subtract the impact of GI sequences.

In one example, a GI configuration may be implemented in either the time domain (TD) or the frequency domain (FD). Both ZT and UW may be generated in TD or FD. A TD generation may be suitable for tracking signals. A FD generation may be suitable for channel estimation.

In one example, a GI configuration may be implemented in either a wide-band (WB) or a narrow-band (NB). Certain signals and/or usages may need to utilize WB (e.g., for channel estimation). For example, if there is a fixed signal as illustrated in FIG. 6C, which is added at the end of the output, the fixed signal may need to be wide band in order to perform the channel estimation for the whole WB. Other signals and/or usages may utilize a narrowband (NB) implementation (e.g., phase noise tracking).

In one example, a GI configuration may be implemented with a specific sequence type. Examples of specific types of sequences include Zadoff-Chu sequences and M-sequence based solution.

According to certain aspects of the disclosure, the linkage between a use purpose and the GI configuration can be specified. In some cases, information regarding how to map a GI configuration to a use purpose may be signaled. For example, information regarding how to map a GI configuration to a use purpose may be signaled, for example, as semi-statically indicated using radio resource control (RRC) signaling, or dynamically indicated using downlink control information (DCI) or medium access control (MAC) control element (CE) signaling. In either case, the transmission may indicate a specific GI configuration preferred for use purpose.

In some cases, a GI configuration preferred for a use purpose may be implicitly assumed by the UE based on certain rules. For example, if a beam switching is scheduled, a ZT GI may be assumed.

According to certain aspects of the present disclosure, a mixed GI configuration may be valid for at least one of a single UE or group of UEs, per beams (i.e., transmission configuration indicator (TCI) states) or all beams, per sub-bands or all sub-bands, and per UE panel or a group of panels.

According to certain aspects of the present disclosure, a UE acting as transmitter can be configured to send a recommendation for certain configurations. Rules to report a particular configuration may be specified or received from a network entity. The assistance information may be per panel or per a group of panels.

As described herein, the UE acting as transmitter may receive signaling with an indication of a GI configuration to select. The UE may select the GI configuration according to the indication based on an application time after receiving the indication. A UE may determine application time based on at least one of a signaled indication, a standard specification, or a capability of the transmitter.

Example Methods

FIG. 7 illustrates example operations 700 for wireless communication by a transmitter. The operations 700 may be performed, for example, by a user equipment (UE) (e.g., such as a UE 104 of FIG. 1) to select a GI configuration from a plurality of GI configurations.

At 710, a transmitter may generate a waveform to be transmitted in one or more symbols, with a guard interval (GI) between adjacent symbols according to a GI configuration selected from a plurality of GI configurations. For example, a UW GI configuration may be selected based on an indication that the transmitted data will be used for the purpose of channel estimation.

At 720, a transmitter may transmit the waveform with the GI between symbols.

FIG. 8 illustrates example operations 800 for wireless communication by a network entity. The operations 800 may be performed, for example, by a base station (e.g., BS 102 of FIG. 1) to select a GI configuration from a plurality of GI configurations.

At 810, the receiver may receive a waveform in one or more symbols, and, with a GI between adjacent symbols according to a GI configuration selected from a plurality of GI configurations. For example, a receiver may receive a narrow-band waveform having a ZT GI configuration where the received symbols are for phase tracking.

At 820, the receiver may process the waveform based on the GI between symbols.

Example Wireless Communication Devices

Figure 9:
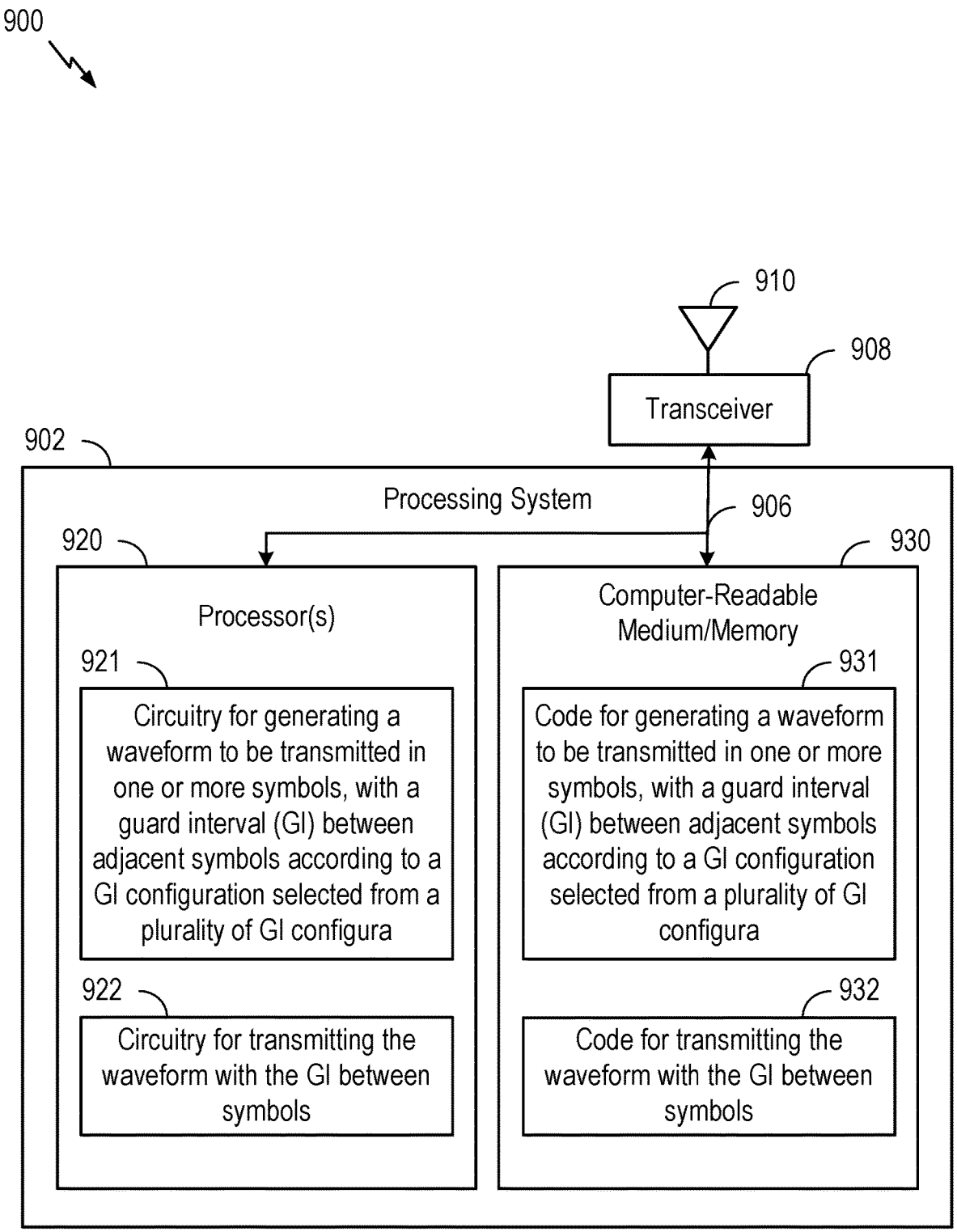
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 7. In some examples, communication device 900 may be a user equipment 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 7, or other operations for performing the various techniques discussed herein for transmitting or receiving a waveform with a guard interval between symbols.

In the depicted example, computer-readable medium/memory 930 stores code 931 for generating a waveform to be transmitted in one or more symbols, with a GI between adjacent symbols according to a GI configuration selected from a plurality of GI configurations, and code 932 for transmitting the waveform with the GI between symbols.

In the depicted example, the one or more processors 920 include circuitry configured to implement the code stored in the computer-readable medium/memory 930, including circuitry 921 for generating a waveform to be transmitted in one or more symbols, with a GI between adjacent symbols according to a GI configuration selected from a plurality of GI configurations, and circuitry 922 for transmitting the waveform with the GI between symbols.

Various components of communications device 900 may provide means for performing the methods described herein, including with respect to FIG. 7.

In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for performing various operations described herein may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including GI component 281).

Notably, FIG. 9 is an example, and many other examples and configurations of communication device 900 are possible.

Figure 10:
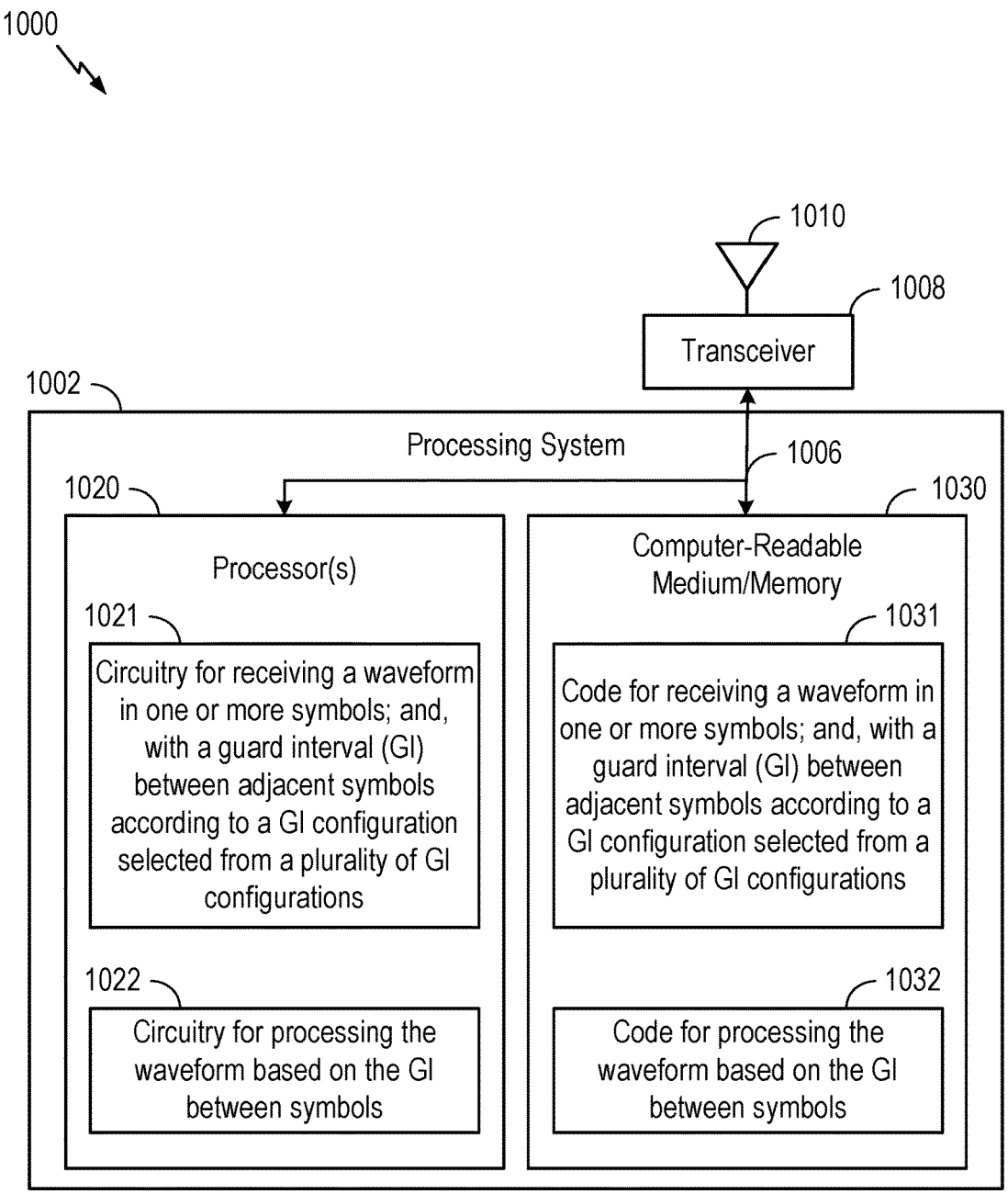
FIG. 10 depicts aspects of an example communications device.

FIG. 10 depicts an example communications device 1000 that includes various components operable, configured, or adapted to perform operations for the techniques disclosed herein, such as the operations depicted and described with respect to FIG. 8. In some examples, communication device 1000 may be a base station 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 8, or other operations for performing the various techniques discussed herein for transmitting or receiving a waveform with a guard interval between symbols.

In the depicted example, computer-readable medium/memory 1030 stores code 1031 for receiving a waveform in one or more symbols, and, with a guard interval (GI) between adjacent symbols according to a GI configuration selected from a plurality of GI configurations, and code 1032 for processing the waveform based on the GI between symbols.

In the depicted example, the one or more processors 1020 include circuitry configured to implement the code stored in the computer-readable medium/memory 1030, including circuitry 1021 for receiving a waveform in one or more symbols, and, with a GI between adjacent symbols according to a GI configuration selected from a plurality of GI configurations circuitry, and 1022 for processing the waveform based on the GI between symbols.

Various components of communications device 1000 may provide means for performing the methods described herein, including with respect to FIG. 8.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for receiving and/or processing may include various processing system components, such as: the one or more processors 1020 in FIG. 10, or aspects of the base station 102 depicted in FIG. 2, including receive processor 238, transmit processor 220, TX MIMO processor 230, and/or controller/processor 240 (including GI component 241).

Notably, FIG. 10 is an example, and many other examples and configurations of communication device 1000 are possible.

Example Clauses

Implementation examples are described in the following numbered clauses:

Clause 1: A method for wireless communications by a transmitter, comprising generating a waveform to be transmitted in one or more symbols, with a guard interval (GI) between adjacent symbols according to a GI configuration selected from a plurality of GI configurations, and transmitting the waveform with the GI between symbols.

Clause 2: The method of clause 1, wherein the plurality of GI configurations comprise at least one zero tail (ZT) GI configuration, and at least one unique word (UW) GI configuration.

Clause 3: The method of any one of clauses 1 and 2, wherein at least one of the GI configurations indicates the GI is to be generated in the time domain and at least one of the GI configurations indicates the GI is to be generated in the frequency domain.

Clause 4: The method of any one of clauses 1 through 3, wherein the plurality of GI configurations comprise at least one wideband GI configuration, and at least one narrowband GI configuration.

Clause 5: The method of any one of clauses 1 through 4, wherein the GI configurations comprise different GI configurations that specify GIs with different sequence types.

Clause 6: The method of any one of clauses 1 through 5, wherein the GI configuration is selected based on at least one of: an intended use of the GI, a type of channel transmitted on the waveform, or a type of reference signal transmitted on the waveform.

Clause 7: The method of clause 6, wherein a first GI configuration is selected if the use of the GI is for channel estimation, and a second GI configuration is selected if the use of the GI is for beam switching.

Clause 8: The method of any one of clauses 6 and 7, wherein a first GI configuration is selected if a physical control channel is transmitted on the waveform, and a second GI configuration is selected if a physical shared channel is transmitted on the waveform.

Clause 9: The method of any one of clauses 6 through 8, wherein a first GI configuration is selected if a demodulation reference signal (DMRS) is transmitted on the waveform, and a second GI configuration is selected if a phase tracking reference signal (PTRS) is transmitted on the waveform.

Clause 10: The method of any one of clauses 6 through 9, further comprising receiving signaling indicating how to select the GI configuration based on the intended use of the GI, the type of channel transmitted on the waveform, or the type of reference signal transmitted on the waveform.

Clause 11. The method of clause 10, wherein the signaling comprises at least one of: radio resource control (RRC), downlink control information (DCI), or medium access control (MAC) control element (CE) signaling.

Clause 12: The method of any one of clauses 6 through 11, further comprising determining, based on one or more rules, how to select the GI configuration based on the intended use of the GI, the type of channel transmitted on the waveform, or the type of reference signal transmitted on the waveform.

Clause 13: The method of any one of clauses 6 through 12, wherein selection of the GI configuration is valid for at least one an individual user equipment (UE) or a group of UEs, an individual beam or a set of beams, an individual sub-band or a group of sub-bands, or an individual antenna panel or a group of antenna panels.

Clause 14: The method of any one of clauses 6 through 13, further comprising transmitting signaling indicating a recommendation for one of the GI configurations.

Clause 15: The method of clause 14, further comprising receiving signaling indicating when to transmit the recommendation for one of the GI configurations.

Clause 16: The method of any one of clauses 6 through 15, further comprising receiving signaling with an indication of one of the GI configurations to select.

Clause 17: The method of clause 16, further comprising selecting the GI configuration according to the indication based on an application time after receiving the indication.

Clause 18: The method of clause 17, further comprising determining the application time based on at least one of a signaled indication, a standard specification, or a capability of the transmitter.

Clause 19: A method for wireless communications by a receiver, comprising receiving a waveform in one or more symbols with a guard interval (GI) between adjacent symbols according to a GI configuration selected from a plurality of GI configurations, and processing the waveform based on the GI between symbols.

Clause 20: The method of clause 19, wherein the plurality of GI configurations comprise at least one zero tail (ZT) GI configuration, and at least one unique word (UW) GI configuration.

Clause 21: The method of any one of clauses 19 and 20, wherein at least one of the GI configurations indicates the GI is to be generated in the time domain, and at least one of the GI configurations indicates the GI is to be generated in the frequency domain.

Clause 22: The method of any one of clauses 19 through 21, wherein the plurality of GI configurations comprise at least one wideband GI configuration, and at least one narrowband GI configuration.

Clause 23: The method of any one of clauses 19 through 22, wherein the GI configurations comprise different GI configurations that specify GIs with different sequence types.

Clause 24: The method of any one of clauses 19 through 23, wherein the GI configuration is selected based on at least one of: an intended use of the GI, a type of channel transmitted on the waveform, or a type of reference signal transmitted on the waveform.

Clause 25: The method of clause 24, wherein a first GI configuration is selected if the use of the GI is for channel estimation, and a second GI configuration is selected if the use of the GI is for beam switching.

Clause 26: The method of any one of claims 24 and 25, wherein a first GI configuration is selected if a physical control channel is transmitted on the waveform, and a second GI configuration is selected if a physical shared channel is transmitted on the waveform.

Clause 27: The method of any one of claims 24 through 26, wherein a first GI configuration is selected if a demodulation reference signal (DMRS) is transmitted on the waveform, and a second GI configuration is selected if a phase tracking reference signal (PTRS) is transmitted on the waveform.

Clause 28: The method of any one of claims 24 through 27, further comprising transmitting, to a transmitter, signaling indicating how to select the GI configuration based on the intended use of the GI, the type of channel transmitted on the waveform, or the type of reference signal transmitted on the waveform.

Clause 29: The method of clause 28, wherein the signaling comprises at least one of: radio resource control (RRC), downlink control information (DCI), or medium access control (MAC) control element (CE) signaling.

Clause 30: The method of any one of claims 24 through 29, further comprising determining, based on one or more rules, how to select the GI configuration based on the intended use of the GI, the type of channel transmitted on the waveform, or the type of reference signal transmitted on the waveform.

Clause 31: The method of any one of claims 19 through 30, wherein selection of the GI configuration is valid for at least one, an individual user equipment (UE) or a group of UEs, an individual beam or a set of beams, an individual sub-band or a group of sub-bands, or an individual antenna panel or a group of antenna panels.

Clause 32: The method of any one of claims 19 through 31, further comprising transmitting signaling, to a transmitter, indicating a recommendation for one of the GI configurations.

Clause 33: The method of clause 32, further comprising receiving signaling, from the transmitter, indicating when to transmit the recommendation for one of the GI configurations.

Clause 34: The method of any one of claims 19 through 33, further comprising transmitting signaling with an indication of one of the GI configurations to select.

Clause 35: The method of clause 34, further comprising selecting the GI configuration according to the indication based on an application time after receiving the indication.

Clause 36: The method of clause 35, further comprising determining the application time based on at least one of a signaled indication, a standard specification, or a capability of the transmitter.

Clause 37: An apparatus, comprising: a memory comprising executable instructions; one or more processors configured to execute the executable instructions and cause the apparatus to perform a method in accordance with any one of Clauses 1-36.

Clause 38: An apparatus, comprising means for performing a method in accordance with any one of Clauses 1-36.

Clause 39: A non-transitory computer-readable medium comprising executable instructions that, when executed by one or more processors of an apparatus, cause the apparatus to perform a method in accordance with any one of Clauses 1-36.

Clause 40: A computer program product embodied on a computer-readable storage medium comprising code for performing a method in accordance with any one of Clauses 1-36.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of implementing guard interval (GI) configurations for various waveforms in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a transmitter, comprising:
    a processor;
    memory coupled with the processor; and
    instructions stored in the memory and executable by the processor to cause the apparatus to:
    generate a waveform to be transmitted in one or more symbols, with a guard interval (GI) between adjacent symbols according to a GI configuration selected from a plurality of GI configurations comprising:
        at least one GI configuration for a zero tail (ZT) GI; and
        at least one GI configuration for a one unique word (UW) GI; and
    transmit the waveform with the GI between symbols.

2. The apparatus of claim 1, wherein selection of the GI configuration is valid for at least one:
    an individual user equipment (UE) or a group of UEs;
    an individual beam or a set of beams;
    an individual sub-band or a group of sub-bands; or
    an individual antenna panel or a group of antenna panels.

3. The apparatus of claim 1, wherein the instructions are further executable by the processor to cause the apparatus to transmit signaling indicating a recommendation for one of the plurality of GI configurations.

4. The apparatus of claim 3, wherein the instructions are further executable by the processor to cause the apparatus to receive signaling indicating when to transmit the recommendation for one of the plurality of GI configurations.

5. The apparatus of claim 1, wherein the instructions are further executable by the processor to cause the apparatus to receive signaling with an indication of one of the plurality of GI configurations to select.

6. The apparatus of claim 5, wherein the instructions are further executable by the processor to cause the apparatus to select the GI configuration according to the indication based on an application time after receiving the indication.

7. The apparatus of claim 6, wherein the instructions are further executable by the processor to cause the apparatus to determine the application time based on at least one of:
a signaled indication;
a standard specification; or
a capability of the transmitter.

8. An apparatus for wireless communications at a transmitter, comprising:
a processor;
memory coupled with the processor; and
instructions stored in the memory and executable by the processor to cause the apparatus to:
generate a waveform to be transmitted in one or more symbols, with a guard interval (GI) between adjacent symbols according to a GI configuration selected from a plurality of GI configurations, wherein:
at least one of the plurality of GI configurations indicates the GI is to be generated in a time domain; and
at least one of the plurality of GI configurations indicates the GI is to be generated in a frequency domain; and
transmit the waveform with the GI between symbols.

9. An apparatus for wireless communications at a transmitter, comprising:
a processor;
memory coupled with the processor; and
instructions stored in the memory and executable by the processor to cause the apparatus to:
generate a waveform to be transmitted in one or more symbols, with a guard interval (GI) between adjacent symbols according to a GI configuration selected from a plurality of GI configurations comprising:
at least one wideband GI configuration; and
at least one narrowband GI configuration; and
transmit the waveform with the GI between symbols.

10. An apparatus for wireless communications at a transmitter, comprising:
a processor;
memory coupled with the processor; and
instructions stored in the memory and executable by the processor to cause the apparatus to:
generate a waveform to be transmitted in one or more symbols, with a guard interval (GI) between adjacent symbols according to a GI configuration selected from a plurality of GI configurations, wherein the plurality of GI configurations comprise different GI configurations that specify GIs with different sequence types; and
transmit the waveform with the GI between symbols.

11. An apparatus for wireless communications at a transmitter, comprising:
a processor;
memory coupled with the processor; and
instructions stored in the memory and executable by the processor to cause the apparatus to:
generate a waveform to be transmitted in one or more symbols, with a guard interval (GI) between adjacent symbols according to a GI configuration selected from a plurality of GI configurations wherein the GI configuration is selected based on at least one of: an intended use of the GI, a type of channel transmitted on the waveform, or a type of reference signal transmitted on the waveform; and
transmit the waveform with the GI between symbols.

12. The apparatus of claim 11, wherein:
a first GI configuration is selected if the intended use of the GI is for channel estimation; and
a second GI configuration is selected if the intended use of the GI is for beam switching.

13. The apparatus of claim 11, wherein:
a first GI configuration is selected if a physical control channel is transmitted on the waveform; and
a second GI configuration is selected if a physical shared channel is transmitted on the waveform.

14. The apparatus of claim 11, wherein:
a first GI configuration is selected if a demodulation reference signal (DMRS) is transmitted on the waveform; and
a second GI configuration is selected if a phase tracking reference signal (PTRS) is transmitted on the waveform.

15. The apparatus of claim 11, wherein the instructions are further executable by the processor to cause the apparatus to receive signaling indicating how to select the GI configuration based on the intended use of the GI, the type of channel transmitted on the waveform, or the type of reference signal transmitted on the waveform.

16. The apparatus of claim 15, wherein the signaling comprises at least one of: radio resource control (RRC), downlink control information (DCI), or medium access control (MAC) control element (CE) signaling.

17. The apparatus of claim 11, wherein the instructions are further executable by the processor to cause the apparatus to determine, based on one or more rules, how to select the GI configuration based on the intended use of the GI, the type of channel transmitted on the waveform, or the type of reference signal transmitted on the waveform.

18. An apparatus for wireless communications at a receiver, comprising:
a processor;
memory coupled with the processor; and
instructions stored in the memory and executable by the processor to cause the apparatus to:
receive a waveform in one or more symbols with a guard interval (GI) between adjacent symbols according to a GI configuration selected from a plurality of GI configurations comprising:
at least one GI configuration for a zero tail (ZT) GI; and
at least one GI configuration for a one unique word (UW) GI; and
process the waveform based on the GI between symbols.

19. An apparatus for wireless communications at a receiver, comprising:
a processor;
memory coupled with the processor; and instructions stored in the memory and executable by the processor to cause the apparatus to:
receive a waveform in one or more symbols with a guard interval (GI) between adjacent symbols according to a GI configuration selected from a plurality of GI configurations, wherein:
at least one of the plurality of GI configurations indicates the GI is to be generated in a time domain; and
at least one of the plurality of GI configurations indicates the GI is to be generated in a frequency domain; and
process the waveform based on the GI between symbols.

20. An apparatus for wireless communications at a receiver, comprising:
a processor;
memory coupled with the processor; and
instructions stored in the memory and executable by the processor to cause the apparatus to:
receive a waveform in one or more symbols with a guard interval (GI) between adjacent symbols according to a GI configuration selected from a plurality of GI configurations comprising:
at least one wideband GI configuration; and
at least one narrowband GI configuration; and
process the waveform based on the GI between symbols.

21. An apparatus for wireless communications at a receiver, comprising:
a processor;
memory coupled with the processor; and
instructions stored in the memory and executable by the processor to cause the apparatus to:
receive a waveform in one or more symbols with a guard interval (GI) between adjacent symbols according to a GI configuration selected from a plurality of GI configurations, wherein the plurality of GI configurations comprise different GI configurations that specify GIs with different sequence types; and
process the waveform based on the GI between symbols.

22. An apparatus for wireless communications at a receiver, comprising:
a processor;
memory coupled with the processor; and
instructions stored in the memory and executable by the processor to cause the apparatus to:
receive a waveform in one or more symbols with a guard interval (GI) between adjacent symbols according to a GI configuration selected from a plurality of GI configurations, wherein the GI configuration is selected based on at least one of: an intended use of the GI, a type of channel transmitted on the waveform, or a type of reference signal transmitted on the waveform; and
process the waveform based on the GI between symbols.

23. The apparatus of claim 22, wherein:
a first GI configuration is selected if the intended use of the GI is for channel estimation; and
a second GI configuration is selected if the intended use of the GI is for beam switching.

24. The apparatus of claim 22, wherein:
a first GI configuration is selected if a physical control channel is transmitted on the waveform; and
a second GI configuration is selected if a physical shared channel is transmitted on the waveform.

25. The apparatus of claim 22, wherein:
a first GI configuration is selected if a demodulation reference signal (DMRS) is transmitted on the waveform; and
a second GI configuration is selected if a phase tracking reference signal (PTRS) is transmitted on the waveform.

26. The apparatus of claim 22, wherein the instructions are further executable by the processor to cause the apparatus to transmit to a transmitter, signaling indicating how to select the GI configuration based on the intended use of the GI, the type of channel transmitted on the waveform, or the type of reference signal transmitted on the waveform.

27. A method for wireless communications by a transmitter, comprising:
generating a waveform to be transmitted in one or more symbols, with a guard interval (GI) between adjacent symbols according to a GI configuration selected from:
at least one GI configuration for a zero tail (ZT) GI; and
at least one GI configuration for a one unique word (UW) GI; and
transmitting the waveform with the GI between symbols.

28. A method for wireless communications by a receiver, comprising:
receiving a waveform in one or more symbols with a guard interval (GI) between adjacent symbols according to a GI configuration selected from:
at least one GI configuration for a zero tail (ZT) GI; and
at least one GI configuration for a one unique word (UW) GI; and
processing the waveform based on the GI between symbols.

* * * * *